US008399097B2

(12) United States Patent
Bennison et al.

(10) Patent No.: US 8,399,097 B2
(45) Date of Patent: *Mar. 19, 2013

(54) HIGH CLARITY LAMINATED ARTICLES COMPRISING AN IONOMER INTERLAYER

(75) Inventors: Stephen J. Bennison, Wilmington, DE (US); Richard Allen Hayes, Beaumont, TX (US); Steven C. Pesek, Orange, TX (US); W Alexander Shaffer, Orange, TX (US); Charles Anthony Smith, Vienna, WV (US)

(73) Assignee: E I du Pont de Nemours and Company, Wilmington, DE (US)

( * ) Notice: Subject to any disclaimer, the term of this patent is extended or adjusted under 35 U.S.C. 154(b) by 93 days.

This patent is subject to a terminal disclaimer.

(21) Appl. No.: 12/610,688

(22) Filed: Nov. 2, 2009

(65) Prior Publication Data

US 2010/0112356 A1    May 6, 2010

Related U.S. Application Data

(60) Provisional application No. 61/110,480, filed on Oct. 31, 2008, provisional application No. 61/141,485, filed on Dec. 30, 2008.

(51) Int. Cl.
*B32B 17/10* (2006.01)
*B32B 27/32* (2006.01)
*B32B 15/08* (2006.01)
*B32B 27/36* (2006.01)

(52) U.S. Cl. ........ 428/412; 428/523; 428/441; 428/461; 526/317.1

(58) Field of Classification Search .................. 428/412, 428/523, 441, 461; 526/317.1
See application file for complete search history.

(56) References Cited

U.S. PATENT DOCUMENTS

| | | | |
|---|---|---|---|
| 2,632,921 A | 3/1953 | Kreidl | |
| 2,648,097 A | 8/1953 | Kritchever | |
| 2,683,894 A | 7/1954 | Krticheveer | |
| 2,704,382 A | 3/1955 | Kreidl | |
| 3,234,062 A | 2/1966 | Morris | |
| 3,311,517 A | 3/1967 | Keslar et al. | |
| 3,344,014 A | 9/1967 | Rees | |
| 3,404,134 A | 10/1968 | Rees | |
| 3,762,988 A | 10/1973 | Clock et al. | |
| 3,852,136 A | 12/1974 | Plumat et al. | |
| 3,986,997 A | 10/1976 | Clark | |
| 4,027,073 A | 5/1977 | Clark | |
| 4,035,549 A | 7/1977 | Kennar | |
| 4,177,315 A | 12/1979 | Ubersax | |
| 4,341,576 A | 7/1982 | Lewis | |
| 4,355,135 A | 10/1982 | January | |
| 4,385,951 A | 5/1983 | Pressau | |
| 4,398,979 A | 8/1983 | Cathers et al. | |
| 4,469,743 A | 9/1984 | Hiss | |
| 4,615,989 A | 10/1986 | Ritze | |
| 4,663,228 A | 5/1987 | Bolton et al. | |
| 4,668,574 A | 5/1987 | Bolton et al. | |
| 4,732,814 A | 3/1988 | Hatada et al. | |
| 4,799,346 A | 1/1989 | Bolton et al. | |
| 4,865,711 A | 9/1989 | Kittler | |
| 5,002,820 A | 3/1991 | Bolton et al. | |
| 5,028,674 A | 7/1991 | Hatch et al. | |
| 5,069,942 A | 12/1991 | Anderson | |
| 5,173,212 A | 12/1992 | Speit et al. | |
| 5,264,286 A | 11/1993 | Ando et al. | |
| 5,411,845 A | 5/1995 | Robinson | |
| 5,415,909 A | 5/1995 | Shohi et al. | |
| 5,415,942 A | 5/1995 | Anderson | |
| 5,536,347 A | 7/1996 | Moran | |
| 5,567,529 A | 10/1996 | Smith | |
| 5,677,529 A | 10/1997 | Hofmann et al. | |
| 5,690,994 A | 11/1997 | Robinson | |
| 5,698,329 A | 12/1997 | Robinson | |
| 5,759,698 A | 6/1998 | Tanuma et al. | |
| 5,763,062 A | 6/1998 | Smith et al. | |
| 5,763,089 A | 6/1998 | Chaussade et al. | |
| 5,770,312 A | 6/1998 | Robinson | |

(Continued)

FOREIGN PATENT DOCUMENTS

| | | | |
|---|---|---|---|
| BR | 200401633 A | 12/2005 | |
| BR | 200401634 A | 12/2005 | |

(Continued)

OTHER PUBLICATIONS

PCT International Search Report and Written Opinion for PCT International application No. PCT/US09/62946, dated Jan. 4, 2010.
PCT International Preliminary Examination Report for PCT International application No. PCT/US09/62946, dated Feb. 9, 2011.
ASTM International Designation D 3418-99, Standard Test Method for Transition Temperatures of Polymers by Differential Scanning Calorimetry, 1999.
ASTM International Designation D3418-03, Standard Test Method for Transition Temperatues and Enthalpies of Fusion and Crystallization of Polymers by Differential Scanning Calorimetry, 2003.
ASTM International Designation D3418-08, Standard Test Method for Transition Temperatues and Enthalpies of Fusion and Crystallization of Polymers by Differential Scanning Calorimetry, 2008.

(Continued)

Primary Examiner — Michael M Bernshteyn
(74) Attorney, Agent, or Firm — Maria M. Kourtakis; Kelly Law Registry; Tong T. Li

(57) ABSTRACT

A safety laminate comprises an interlayer that comprises an ionomer that is the neutralized product of a precursor acid copolymer. The precursor acid copolymer comprises copolymerized units of a first α-olefin having 2 to 10 carbon atoms and about 20 to about 30 wt % of copolymerized units of a first α,β-ethylenically unsaturated carboxylic acid having 3 to 8 carbon atoms; and has a melt flow rate of about 10 to about 4000 g/10 min. When neutralized to a level of about 40% to about 90% and when comprising counterions that consist essentially of sodium cations, the precursor acid copolymer produces a sodium ionomer that has a melt flow rate of about 0.7 to about 25 g/10 min and a freeze enthalpy that is not detectable or that is less than about 3.0 j/g. The ionomer composition may further comprise a second ionomer that has a melt flow rate of about 10 g/10 min or less.

20 Claims, 2 Drawing Sheets

U.S. PATENT DOCUMENTS

| | | |
|---|---|---|
| 5,853,516 A | 12/1998 | Lehto |
| 5,895,721 A | 4/1999 | Naoumenko et al. |
| 6,150,028 A | 11/2000 | Mazon |
| 6,265,054 B1 | 7/2001 | Bravet et al. |
| 6,340,646 B1 | 1/2002 | Nagashima et al. |
| 6,342,116 B1 | 1/2002 | Balduin et al. |
| 6,432,522 B1 | 8/2002 | Friedman et al. |
| 6,455,161 B1 * | 9/2002 | Regnier et al. ............... 428/412 |
| 6,461,736 B1 | 10/2002 | Nagashima et al. |
| 6,468,934 B2 | 10/2002 | Nagashima et al. |
| 6,518,365 B1 | 2/2003 | Powell et al. |
| 7,189,457 B2 | 3/2007 | Anderson |
| 7,294,401 B2 | 11/2007 | Anderson et al. |
| 7,641,965 B1 | 1/2010 | Bennison et al. |
| 7,763,360 B2 | 7/2010 | Paul et al. |
| 7,919,175 B2 | 4/2011 | Bennison et al. |
| 7,951,865 B1 | 5/2011 | Paul et al. |
| 2002/0155302 A1 | 10/2002 | Smith et al. |
| 2003/0124296 A1 | 7/2003 | Smith |
| 2004/0182493 A1 | 9/2004 | Chick |
| 2005/0037216 A1 | 2/2005 | Chen et al. |
| 2005/0077002 A1 | 4/2005 | Anderson et al. |
| 2006/0182983 A1 | 8/2006 | Paul et al. |
| 2007/0092706 A1 * | 4/2007 | Pesek et al. ............... 428/220 |
| 2007/0122633 A1 | 5/2007 | Pesek et al. |
| 2007/0289693 A1 * | 12/2007 | Anderson et al. ............... 156/99 |
| 2008/0023063 A1 | 1/2008 | Hayes et al. |
| 2008/0044666 A1 | 2/2008 | Anderson et al. |
| 2009/0242030 A1 | 10/2009 | Kirschner et al. |
| 2009/0324935 A1 | 12/2009 | Bennison et al. |
| 2010/0112356 A1 | 5/2010 | Bennison et al. |
| 2010/0167061 A1 | 7/2010 | Bennison et al. |

FOREIGN PATENT DOCUMENTS

| | | |
|---|---|---|
| EP | 1235683 B1 | 8/2003 |
| EP | 1759832 A1 | 7/2007 |
| JP | 2000186114 A | 7/2000 |
| WO | 9101880 A1 | 2/1991 |
| WO | 9958334 A2 | 11/1999 |
| WO | 0006619 A1 | 2/2000 |
| WO | 0133978 A1 | 5/2001 |
| WO | 0160604 A1 | 8/2001 |
| WO | 03057478 A1 | 7/2003 |
| WO | 03068501 A1 | 8/2003 |
| WO | 2006005771 A1 | 1/2006 |
| WO | 2007079091 A1 | 7/2007 |
| WO | 2007149082 A1 | 12/2007 |

OTHER PUBLICATIONS

ASTM International Designation D3417-99, Standard Test Method for Enthalpies of Fusion and Crystallization of Polymers by Differential Scanning Calorimetry (DSC), 1999.

* cited by examiner

HIGH CLARITY LAMINATED ARTICLES COMPRISING AN IONOMER INTERLAYER

CROSS-REFERENCE TO RELATED APPLICATION

This application claims priority under 35 U.S.C. §120 to U.S. Provisional Appln. Nos. 61/110,480, filed on Oct. 31, 2008, and 61/141,485, filed on Dec. 30, 2008, each of which is incorporated herein by reference in its entirety.

FIELD OF THE INVENTION

Provided herein are safety laminates that comprise a polymeric interlayer sheet formed of an ionomer composition. In particular, the interlayer sheet provides superior clarity and toughness due to the properties of the ionomer composition.

BACKGROUND OF THE INVENTION

Several patents and publications are cited in this description in order to more fully describe the state of the art to which this invention pertains. The entire disclosure of each of these patents and publications is incorporated by reference herein.

Safety laminates have been in commercial production for almost a century and have been utilized in applications that require sheet material having a high degree of clarity and impact resistance. For example, safety laminates have been widely used in the automobile industry as windshields or side windows because the laminate structures are characterized by high impact and penetration resistance and because they do not scatter glass shards and debris when shattered. More recently, safety laminates have also been incorporated into building structures as window, walls, stairs, etc.

Simple safety laminates typically consist of a sandwich of two glass sheets or panels bonded together with an interlayer of a polymeric sheet. One or both of the glass sheets may be replaced with optically clear rigid polymeric sheets, such as sheets made of polycarbonate. Safety glass laminates have further evolved to include multiple layers of glass and polymeric sheets bonded together with interlayers of polymeric sheets.

The interlayers used in safety laminates are typically made from relatively thick polymer sheets, which exhibit toughness and bondability to the glass in the event of a crack or crash. Widely used interlayer materials include complex, multicomponent compositions based on poly(vinyl butyral), poly(urethane), and ethylene vinyl acetate copolymers.

Ionomers are copolymers produced by partially or fully neutralizing the carboxylic acid groups of precursor or parent polymers that are acid copolymers comprising copolymerized residues of α-olefins and α,β-ethylenically unsaturated carboxylic acids. The use of ionomer interlayer sheets in safety laminates is known. See, for example, U.S. Pat. Nos. 3,344,014; 3,762,988; 4,663,228; 4,668,574; 4,799,346; 5,759,698; 5,763,062; 5,895,721; 6,150,028; 6,265,054; and 6,432,522, U.S. Patent Appln. Publn. Nos. 20020155302; 20060182983; 20070092706; 20070122633; 20070289693; 20080044666, and PCT Patent Appln. Publn. Nos. WO9958334; WO2006057771; and WO2007149082.

In this connection, ionomers have been useful in safety laminates intended for structures requiring a high degree of penetration resistance. Some examples include hurricane-resistant glazing and structural elements such as glass staircases and glass balustrades. In particularly demanding application, the use of ionomeric interlayer sheets in safety laminates having ballistic resistance is described in, e.g., U.S. Pat. No. 5,002,820 and PCT Patent Appln. Publn. No. WO03068501.

One way to improve ballistic resistance of a safety laminate is to increase the number of laminate layers or the thickness of the laminate layers. As the total thickness of the interlayer material in a safety laminate increases, any deficiency in the material's optical properties, such as haze, for example, increases in significance. These deficiencies may be exacerbated by the slower cooling rates typical of thicker safety laminates, which are more conducive to the formation of crystals.

Accordingly, there is a need to develop an ionomer composition that is useful in safety laminates and that is capable of retaining good optical properties when used at greater thicknesses, or when the manufacturing process requires slower cooling conditions.

SUMMARY OF THE INVENTION

Accordingly, provided herein is a safety laminate comprising at least one interlayer sheet that is laminated to one or more rigid sheets, one or more other interlayers, or one or more film layers, said at least one interlayer sheet comprising an ionomer composition; and said ionomer composition comprising a first ionomer that is the neutralized product of a first precursor acid copolymer, wherein, (A) the first precursor acid copolymer comprises copolymerized units of a first α-olefin having 2 to 10 carbon atoms and about 20 to about 30 wt %, based on the total weight of the first precursor acid copolymer, of copolymerized units of a first α,β-ethylenically unsaturated carboxylic acid having 3 to 8 carbon atoms; (B) the first precursor acid copolymer has a melt flow rate of about 10 to about 4000 g/10 min, as determined in accordance with ASTM D1238 at 190° C. and 2.16 kg; and (C) the first precursor acid copolymer, when neutralized to a level of about 40% to about 90% and when comprising counterions that consist essentially of sodium cations, produces a sodium ionomer, and said sodium ionomer has a melt flow rate of about 0.7 to about 25 g/10 min and a freeze enthalpy that is not detectable or that is less than about 3.0 j/g, when determined by differential scanning calorimetry (DSC) in accordance with ASTM D3418.

The ionomer composition may further comprise a second ionomer that is that is the neutralization product of a second precursor acid copolymer, wherein, (D) the second precursor acid copolymer comprises copolymerized units of a second α-olefin having 2 to 10 carbon atoms and about 18 to about 30 wt % of copolymerized units of a second α,β-ethylenically unsaturated carboxylic acid having 3 to 8 carbon atoms; (E) the second α-olefin may be the same as or different from the first α-olefin; and the second α,β-ethylenically unsaturated carboxylic acid may be the same as or different from the first α,β-ethylenically unsaturated carboxylic acid; and (F) the second precursor acid copolymer has a melt flow rate of about 60 g/10 min or less; and (G) the second ionomer has a melt flow rate of about 10 g/10 min or less.

DETAILED DESCRIPTION OF THE INVENTION

Figure 1:
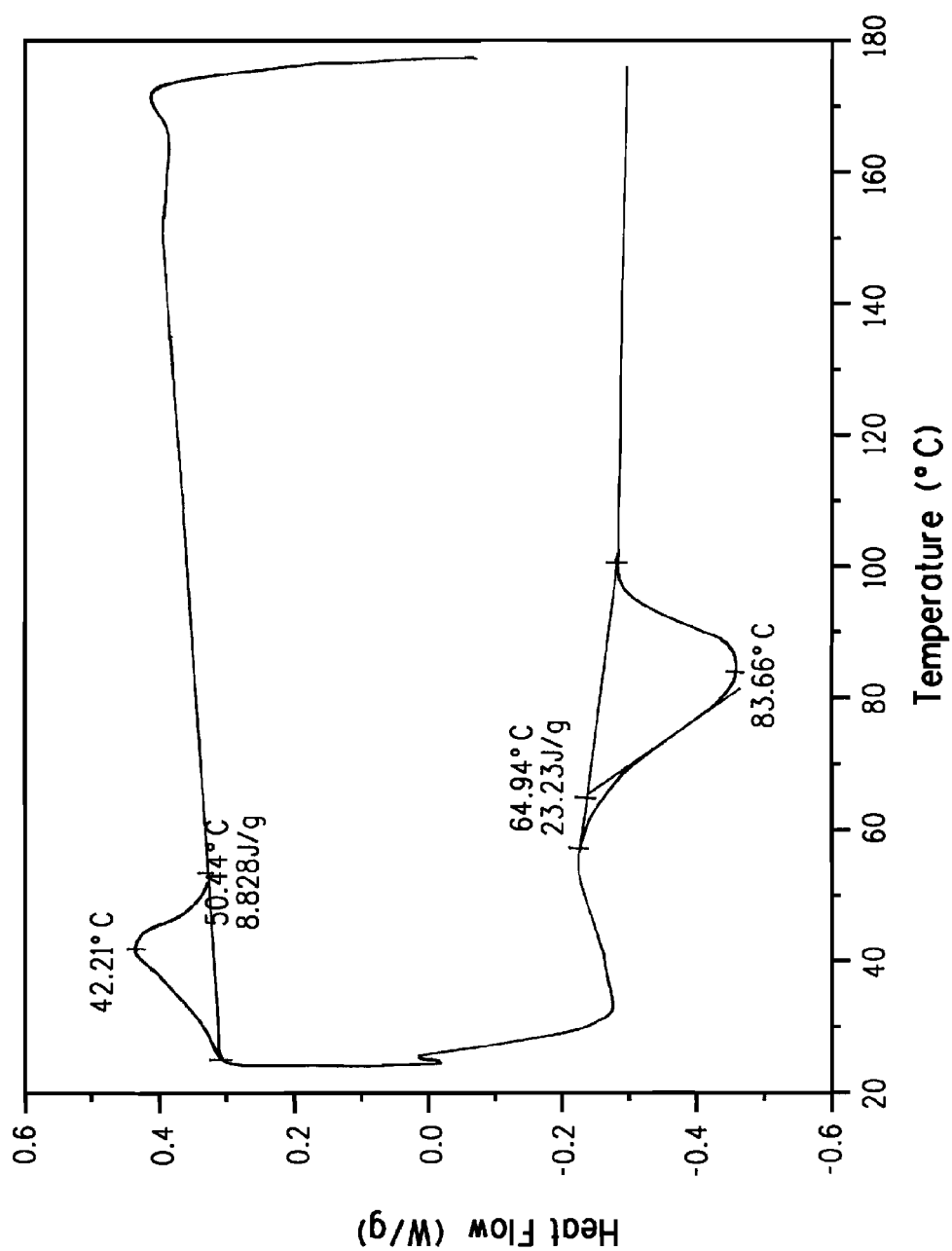
FIG. 1 is a trace of a differential scanning calorimetry (DSC) measurement of a prior art ionomer.

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at a level that is appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

Unless otherwise specified under limited circumstances, all melt flow rates are measured according to ASTM method D1238 at a polymer melt temperature of 190° C. and under a weight of 2.16 kg. Moreover, the terms melt flow rate (MFR), melt flow index (MFI) and melt index (MI) are synonymous and used interchangeably herein.

The terms "freeze enthalpy", "heat of crystallization" and "enthalpy of crystallization", as used herein, are synonymous and interchangeable. The terms "heat of crystallization" and "enthalpy of crystallization" are defined in ASTM Method No. D3418, published in December, 2008.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers consisting essentially of three monomers.

The term "acid copolymer" as used herein refers to a polymer comprising copolymerized units of an α-olefin, an α,β-ethylenically unsaturated carboxylic acid, and optionally other suitable comonomer(s) such as, an α,β-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

Finally, the term "ionomer" as used herein refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. An example of an alkali metal ionomer as used herein is a sodium ionomer (or sodium neutralized mixed ionomer), for example a copolymer of ethylene and methacrylic acid wherein all or a portion of the carboxylic acid groups of the copolymerized methacrylic acid units are in the form of sodium carboxylate groups.

Provided herein is a safety laminate comprising at least one rigid sheet layer or at least one film layer and at least one interlayer sheet, wherein the interlayer sheet comprises an ionomer composition. The ionomer composition comprises an ionomer that is an ionic, neutralized derivative of a precursor acid copolymer. The precursor acid copolymer comprises copolymerized units of an α-olefin having 2 to 10 carbons and copolymerized units of an α,β-ethylenically unsaturated carboxylic acid having 3 to 8 carbons Preferably, the precursor acid copolymer comprises about 20 to about 30 wt %, or about 20 to about 25 wt %, based on the total weight of the precursor acid copolymer, of the copolymerized carboxylic acid. The amount of copolymerized α-olefin is complementary to the amount of copolymerized carboxylic acid and other comonomers, if present, so that the sum of the weight percentages of the comonomers in the precursor acid copolymer is 100 wt %.

Suitable α-olefin comonomers include, but are not limited to, ethylene, propylene, 1-butene, 1-pentene, 1-hexene, 1-heptene, 3 methyl-1-butene, 4-methyl-1-pentene, and the like and combinations of two or more of these α-olefins. In one embodiment, the α-olefin is ethylene.

Suitable α,β-ethylenically unsaturated carboxylic acid comonomers include, but are not limited to, acrylic acids, methacrylic acids, itaconic acids, maleic acids, maleic anhydrides, fumaric acids, monomethyl maleic acids, and combinations of two or more of these acid comonomers. In one embodiment, the α,β-ethylenically unsaturated carboxylic acid is selected from acrylic acids, methacrylic acids, and combinations of two or more (meth)acrylic acids.

The precursor acid copolymer may further comprise copolymerized units of other comonomer(s), such as unsaturated carboxylic acids having 2 to 10, or 3 to 8 carbon atoms, or derivatives thereof. Suitable acid derivatives include acid anhydrides, amides, and esters. Some suitable precursor acid copolymers further comprise an ester of the unsaturated carboxylic acid. Examples of suitable esters of unsaturated carboxylic acids include, but are not limited to, those that are set forth in U.S. Patent Appln. Publn. No. 2010/0112253 by Hausmann et al. Examples of preferred comonomers include, but are not limited to, methyl (meth)acrylates, butyl (meth) acrylates, glycidyl methacrylates, vinyl acetates, and combinations of two or more thereof. Preferably, however, the precursor acid copolymer does not incorporate other comonomers in any significant amount.

The precursor acid copolymer may have a melt flow rate (MFR) of about 10 to about 4000 g/10 min, about 10 to about 2500 g/10 min, about 10 to about 1400 g/10 min, about 70 to about 1000 g/10 min, or about 100 to about 500 g/10 min, or about 200 to about 500 g/10 min, as determined in accordance with ASTM method D1238 at 190° C. and 2.16 kg.

Combinations of precursor acid copolymers are also suitable, provided that the properties of the copolymers are within the ranges described herein. For example, two or more dipolymers having differing amounts of copolymerized carboxylic acid comonomer or differing melt indices may be used. Also, a mixture of precursor acid copolymers including a dipolymer and a terpolymer may be suitable.

The precursor acid copolymers may be synthesized by methods that are described in detail in U.S. Patent Appln. Publn. No. 2010/0112253, cited above. When a precursor acid copolymer synthesized by these methods is neutralized with a sodium ion-containing base to a level of about 40% to about 90%, or about 40% to about 70%, or about 43% to about 60%, based on the total carboxylic acid content of the precursor acid copolymers as calculated or measured for the non-neutralized precursor acid copolymers, and when the resulting sodium (neutralized) ionomer has a MFR of about 0.7 to about 25 g/10 min or less, or about 0.7 to about 19 g/10 min or less, or about 1 to about 10 g/10 min, or about 1.5 to about 5 g/10 min, or about 2 to about 4 g/10 min, as determined in accordance with ASTM method D1238 at 190° C. and 2.16 kg, then the sodium ionomer has a freeze enthalpy that is not detectable or less than about 3 j/g, or less than about 2 j/g, as determined by differential scanning calorimetry (DSC) in accordance with ASTM method D3418 when using a DSC apparatus manufactured by Mettler or by TA (for example the Universal V3.9A model).

The term "not detectable", as used in this context, refers to a freeze enthalpy that produces no observable inflection in the DSC curve. Alternatively, the peak height may be very small and the peak width at half height may be relatively great, so that a broad peak having a small integral area may not be detectable or discernable when a baseline is subtracted from the DSC trace. In general, when ASTM D3418 is followed, a freeze enthalpy that falls below 0.2 j/g is not detectable. The precursor acid copolymers and their sodium ionomers are described in detail in Applicants' co-pending U.S. Patent Appln. Publn. No. 2010/011253, cited above, and in U.S. Patent Appln. Publn. No. 2010/0108126, by Pesek et al. Preferred examples of the first precursor copolymer are synthesized under conditions that are well within the single phase region that is described in U.S. Patent Appln. Publn. No. 2010/0112253 and the references cited therein.

To obtain the ionomers useful in the ionomer compositions described herein, the precursor acid copolymers are neutralized with a base so that the carboxylic acid groups in the precursor acid copolymer react to form carboxylate groups. Preferably, the precursor acid copolymers groups are neutralized to a level of about 20 to about 90 wt %, or about 30% to about 90%, or about 35% to about 90%, or about 40% to about 90%, or about 40% to about 70%, or about 43% to about 60%, based on the total carboxylic acid content of the precursor acid copolymers as calculated or measured for the non-neutralized precursor acid copolymers.

Any stable cation and any combination of two or more stable cations are believed to be suitable as counterions to the carboxylate groups in the ionomer. Divalent and monovalent cations, such as cations of alkali metals, alkaline earth metals, and some transition metals, are preferred. Zinc cations are preferred divalent ions. Monovalent cations are more preferred. Still more preferably, the base is a sodium ion-containing base, to provide a sodium ionomer wherein about 40% to about 90%, or about 40% to about 70%, or about 43% to about 60% of the hydrogen atoms of the carboxylic acid groups of the precursor acid are replaced by sodium cations.

The resulting neutralized ionomer may have a MFR of about 25 g/10 min or less, or about 0.7 to about 25 g/10 min or less, or about 0.7 to about 19 g/10 min or less, or about 1 to about 10 g/10 min, or about 1.5 to about 5 g/10 min, or about 2 to about 4 g/10 min, as determined in accordance with ASTM method D1238 at 190° C. and 2.16 kg.

To obtain the ionomers used herein, the precursor acid copolymers may be neutralized by any conventional procedure, such as those disclosed in U.S. Pat. Nos. 3,404,134 and 6,518,365, and by other procedures that will be apparent to those of ordinary skill in the art. Some of these methods are described in detail in U.S. Patent Appln. Publn. No. 2010/0166992, by Hausmann et al.

The ionomer composition may further comprise other polymers, such as, for example, a second ionomer that is distinct from the ionomer described above. From this point forward, the ionomer described above may also be referred to as "the first ionomer" that is an ionic neutralized product of "the first precursor acid copolymer". The ionomer composition may comprise, based on the total weight of the blend composition, about 5 to about 95 wt % of the first ionomer and about 5 to about 95 wt % of the second ionomer, or about 60 to about 95 wt % of the first ionomer and about 5 to about 40 wt % of the second ionomer, or about 70 to about 90 wt % of the first ionomer and about 10 to about 30 wt % of the second ionomer, or about 70 to about 80 wt % of the first ionomer and about 20 to about 30 wt % of the second ionomer.

The second ionomer used in the blend composition is an ionic, neutralized derivative of a second precursor acid copolymer comprising copolymerized units of an α-olefin having 2 to 10 carbon atoms and about 18 to about 30 wt %, or about 20 to about 25 wt %, or about 21 to about 24 wt % of copolymerized units of an α,β-ethylenically unsaturated carboxylic acid having 3 to 8 carbon atoms. The second precursor acid copolymer may have a melt flow rate (MFR) of about 60 g/10 min or less, or about 45 g/10 min or less, or about 30 g/10 min or less, or about 25 g/10 min or less, as determined in accordance with ASTM method D1238 at 190° C. and 2.16 kg.

To obtain the second ionomer used in the blend composition, the second precursor acid copolymer may be neutralized with one or more ion-containing bases to provide an ionomer wherein about 10% to about 35%, or about 15% to about 30% of the hydrogen atoms of carboxylic acid groups of the second precursor acid copolymer is replaced by metal cations. That is, the acid groups are neutralized to a level of about 10% to about 35%, or about 15% to about 30%, based on the total carboxylic acid content of the second precursor acid copolymer as calculated or measured for the non-neutralized second precursor acid copolymer. At these neutralization levels, the second ionomer may have a MFR of about 10 g/10 min or less, or about 5 g/10 min or less, or about 3 g/10 min or less, as determined in accordance with ASTM method D1238 at 190° C. and 2.16 kg. Those of skill in the art are aware, however, that the neutralization levels of two ionomers in a blend will equilibrate over time to a shared neutralization level that is determined by the total number of acid and base equivalents in the ionomer blend.

The melt flow rates of the ionomer blend are expected to lie between the melt flow rate of the first ionomer and that of the second ionomer, when each is neutralized to the same extent as the blend.

Suitable α-olefin and α,β-ethylenically unsaturated carboxylic acids comprised in the second precursor acid copolymers are as described above with respect to the first precursor acid copolymer. The second precursor acid copolymer may also further comprise copolymerized units of other comonomer(s), such as those described above as suitable for use in the first precursor acid copolymer. The second precursor acid copolymer and the second ionomer may be prepared in the same manner as the first ionomer is prepared. Finally, the ionomer blend composition may be prepared by any suitable blending process, such as melt blending.

The ionomer composition described herein may further contain any suitable additive known in the art. Such additives include, but are not limited to, plasticizers, processing aides, flow enhancing additives, flow reducing additives (e.g., organic peroxides), lubricants, pigments, dyes, optical brighteners, flame retardants, impact modifiers, nucleating agents, antiblocking agents (e.g., silica), thermal stabilizers, hindered amine light stabilizers (HALS), UV absorbers, UV stabilizers, dispersants, surfactants, chelating agents, coupling agents, adhesives, primers, reinforcement additives (e.g., glass fiber), fillers, and the like, and mixtures or combinations of two or more conventional additives. These additives are described in the *Kirk Othmer Encyclopedia of Chemical Technology*, 5$^{th}$ Edition, John Wiley & Sons (New Jersey, 2004), for example.

These conventional ingredients may be present in the compositions in quantities of about 0.01 to about 15 wt %, or about 0.01 to about 10 wt %, so long as they do not detract from the basic and novel characteristics of the composition and do not significantly adversely affect the performance of the composition or of the articles prepared from the composition. In this connection, the weight percentages of such additives are not included in the total weight percentages of the ionomer compositions defined herein. Typically, such additives may be present in amounts of about 0.01 to about 5 wt %, based on the total weight of the ionomer composition.

Three notable additives are thermal stabilizers, UV absorbers, and hindered amine light stabilizers. These additives are described in detail in U.S. Patent Appln. Publn. No. 2010/0166992, cited above. A fourth notable additive is a silane coupling agent, which may be added to the sodium/zinc mixed ionomer composition to improve its adhesive strength. Examples of suitable silane coupling agents that are useful in the compositions described herein include, but are not limited to, γ-chloropropylmethoxysilane, vinyltrimethoxysilane, vinyltriethoxysilane, vinyltris(β-methoxyethoxy)silane, γ-vinylbenzylpropyl-trimethoxysilane, N-β-(N-vinylbenzylaminoethyl)-γ-aminopropyltrimethoxy-silane, γ-methacryloxypropyl-trimethoxysilane, vinyltriacetoxysilane, γ-glycidoxypropyl-trimethoxysilane, γ-glycidoxypropyltriethoxysilane, β-(3,4-epoxycyclohexyl)-ethyltrimethoxysilane, vinyltrichlorosilane, γ-mercapto-propylmethoxysilane, γ-aminopropyltriethoxy-silane, N-β-(aminoethyl)-γ-aminopropyltrimethoxysilane, and combinations of two or more thereof. The silane coupling agents may be incorporated in the sodium/zinc mixed ionomer composition at a level of about 0.01 to about 5 wt %, or about 0.05 to about 1 wt %, based on the total weight of the sodium/zinc mixed ionomer composition.

The optional incorporation of such conventional ingredients into the compositions can be carried out by any known process. This incorporation can be carried out, for example, by dry blending, by extruding a combination of the various constituents, by a masterbatch technique, or the like. See, again, the *Kirk-Othmer Encyclopedia*.

Further provided is a polymeric interlayer for use in safety laminates that comprises the ionomer composition described herein. Interlayers comprising or made from these ionomer compositions exhibit equal or better optical properties (e.g., equal or lower haze as determined in accordance with ASTM D1003) than those made from prior art ionomers. Moreover, such improved optical properties are not affected by the cooling rate that follows the process of fabricating the interlayer, nor by the cooling rate that follows the process of fabricating the safety laminate that comprises the interlayer, for reasons that are discussed at length in U.S. Patent Appln. Publn. No. 20100112253, cited above. Briefly, however, the ionomer composition described herein has good optical properties, even when cooled at very low rates. The exceptionally small or even unmeasurable freeze enthalpies described herein are evidence that the first ionomer has no tendency, an insignificant tendency, or a very low tendency towards crystallization.

In addition, the second ionomer is derived from the second acid copolymer having a relatively lower MFR (about 60 g/10 min or lower when determined in accordance with ASTM D1238 at 190° C. and 2.16 kg). Therefore, the toughness of the blend composition is increased over that of the first ionomer. Moreover, the haze level of a polymer blend is often increased compared to either of the two polymer components. Accordingly, it is expected that the haze of the blend composition would be higher than that of the first or the second ionomer. It has been surprisingly found, however, that the ionomer blends described herein have a haze level that is consistently lower than that of the second ionomer and that may be lower than that of either the first or the second ionomer.

Returning now to the description of the polymeric interlayer, it may have a single layer or multilayer form. By "single layer", it is meant that the sheet is made of or consists essentially of the sodium ionomer composition disclosed herein. When in a multilayer form, it is made up of two or more sub-layers and at least one of the sub-layers is made of or consists essentially of the ionomer composition, while the other sub-layer(s) may be made of any other suitable polymeric material(s), such as, for example, acid copolymers as previously defined herein, ionomers as previously defined herein, ethylene/vinyl acetate copolymers, poly(vinyl acetals) (including acoustic grade poly(vinyl acetals)), polyurethanes, polyvinylchlorides, polyethylenes (e.g., linear low density polyethylenes), polyolefin block elastomers, copolymers of α-olefins and α,β-ethylenically unsaturated carboxylic acid esters (e.g., ethylene methyl acrylate copolymers and ethylene butyl acrylate copolymers), silicone elastomers, epoxy resins, and combinations of two or more thereof. In addition, when two or more sublayers are present in the polymeric interlayer sheets, the sublayers may be formed of polymeric materials that are the same or different.

Further, the sheet comprising the sodium/zinc mixed ionomer composition may have a smooth or rough surface on one or both sides to facilitate deaeration during the lamination process. Rough surfaces can be created by known processes such as mechanical embossing or by melt fracture during extrusion of the sheets, or by processes described in, e.g., U.S. Pat. No. 4,035,549 and U.S. Patent Publication No. 2003/0124296.

The interlayer sheets comprising the ionomer compositions may be produced by any suitable process. For example, the sheets may be formed through dipcoating, solution casting, compression molding, injection molding, lamination, melt extrusion, blown film, extrusion coating, tandem extrusion coating, or by any other procedures that are known to those of skill in the art. In particular, the sheets may be formed by melt extrusion, melt coextrusion, melt extrusion coating, blown film process, or tandem melt extrusion coating processes.

One preferred safety laminate comprises at least one interlayer sheet comprising the ionomer composition, and the interlayer sheet is laminated to at least one rigid sheet or film layer. By "laminated", it is meant that, within a laminated structure, the two layers are adhered or bonded either directly (i.e., without any additional material between the two layers) or indirectly (i.e., with additional material, such as interlayer or adhesive materials, between the two layers).

Suitable rigid sheets comprise a material with a modulus of about 100,000 psi (690 MPa) or greater (as measured by ASTM Method D-638). The rigid sheets used here may be formed of glass, metal, ceramic, or of polymers including polycarbonates, acrylics, polyacrylates, cyclic polyolefins, polystyrene prepared in the presence of metallocene catalysts, and combinations of two or more thereof. Other suitable rigid sheets are described in U.S. Patent Appln. Publn. No. 2010/0167061, by Bennison et al.

The film layers used herein may be metal (such as aluminum foil) or polymeric. Suitable polymeric film materials include, but are not limited to, those described in U.S. Patent Appln. Publn. No. 2010/0167061, cited above.

When the polymeric film is located at the outside surface of the safety laminate, it may be further coated with an abrasion resistant hardcoat. Any material known for use in abrasion resistant hardcoats may be used herein. Suitable materials include, but are not limited to, those described in U.S. Patent Appln. Publn. No. 2010/0167061, cited above.

The safety laminates may further comprise other polymeric interlayer sheets formed of polymeric materials, such as poly(vinyl acetal) (e.g., poly(vinyl butyral) (PVB)), poly(vinyl chloride), polyurethane, ethylene/vinyl acetate copolymers, acid copolymers, other ionomers, or combinations of two or more thereof. In addition, when two or more polymeric sheets are incorporated in the safety laminate, the polymeric interlayer sheets may be formed of polymeric materials that are the same or different.

Each of the interlayer sheets comprising the ionomer compositions and each of the other polymeric interlayer sheets comprised in the safety laminates may have a thickness of at least about 5 mils (0.1 mm), or at least about 30 mils (0.8 mm), or about 30 to about 200 mils (about 0.8 to about 5.1 mm), or about 45 to about 200 mils (about 1.1 to about 5.1 mm), or about 45 to about 100 mils (about 1.1 to about 2.5 mm), or about 45 to about 90 mils (about 1.1 to about 2.3 mm).

One preferred safety laminate comprises (a) a first rigid sheet or film layer, which is laminated to (b) a sheet comprising the sodium ionomer composition, which is laminated to (c) a second rigid sheet or film layer. For example, the safety laminate may comprise two glass sheets with an interlayer sheet comprising the sodium ionomer composition laminated between the two glass sheets, or the safety laminate may comprise a glass sheet and a hardcoated polyester film with an interlayer sheet comprising the sodium ionomer composition laminated between the glass sheet and the hardcoated plastic film.

Another safety laminate may comprise n plies of rigid sheet or film layers (such as glass sheet layers) and n−1 plies of polymer interlayer sheets, wherein (a) each adjacent pair of the rigid sheet or film layers are interspaced by one of the polymer interlayer sheets; (b) at least one, or preferably each, of the polymer interlayer sheets is the sodium ionomer interlayer sheet disclosed above, and (c) n is an integer and $2 \leq n \leq 10$. Such safety laminates are described at length in U.S. patent application Ser. No. 12/215,839, filed on Jun. 30, 2008.

Some examples of preferred safety laminates include, but are not limited to, rigid sheet/interlayer sheet; polymer film/interlayer sheet; rigid sheet/interlayer sheet/polymer film; rigid sheet/interlayer sheet/rigid sheet; polymeric film/interlayer sheet/polymer film; rigid sheet/interlayer sheet/polymer film/interlayer sheet/rigid sheet; and others set forth in U.S. Patent Appln. Publn. No. 2010/0167061, cited above, wherein "/" indicates adjacent layers. Moreover, when two or more of any film or sheet occur in the same laminate, they may be the same as or different from each other, provided that at least one of the interlayer sheets comprises or is produced from the ionomer composition described herein. Furthermore, in some preferred laminates, the adjacent layers are laminated directly to each other so that they are adjoining or, more preferably, contiguous in the laminate structure.

Further provided herein are safety laminates having ballistic resistance. Ballistic resistant safety laminates may comprise multiple rigid sheets, such as glass sheets, and multiple polymer interlayer sheets, wherein each adjacent pair of the rigid sheets is interspaced by one of the polymer interlayer sheets and at least one of the polymer interlayer sheets is the ionomer interlayer sheet described above.

The ballistic resistant safety laminate may further comprise a polymer film positioned in the laminate as an outermost layer facing away from the impact force. Preferably, the polymer film is selected from polyester films described in U.S. Patent Appln. Publn. No. 2010/0167061, cited above.

In yet another example, the ballistic resistant safety laminate comprises an impact zone and, adhered firmly to the impact zone, an anti-spall zone, wherein the impact zone faces to the impact force and comprises n glass sheets and (n−1) polymer interlayer sheets with (i) each adjacent pair of the glass sheets interspaced by one of the polymer interlayer sheet; (ii) n being an integer of 2-10; and (iii) at least one of the polymer interlayer sheets being the sodium ionomer interlayer sheet disclosed above; and wherein the anti-spall zone faces away from the impact force and comprises an additional polymer sheet (e.g., a PVB sheet) and a polymer film (e.g., a PET film) with a first surface of the polymer sheet adhered firmly to the impact zone and a second surface of the polymer sheet adhered firmly to the polymer film. Safety laminates of this type are described in greater detail in co-pending U.S. Pat. No. 7,641,965 issued to Bennison et al., filed on Jun. 30, 2008.

The ballistic resistant safety laminates disclosed here may take any form known within the art. Some specific constructions include, but are not limited to, rigid sheet/interlayer sheet/rigid sheet/interlayer sheet/ rigid sheet;
glass sheet/interlayer sheet/glass sheet/interlayer sheet/ glass sheet;
glass sheet/interlayer sheet/glass sheet/interlayer sheet sheet/rigid sheet;
rigid sheet/interlayer sheet/rigid sheet/polymer sheet/rigid sheet;
glass sheet/interlayer sheet/glass sheet/polyurethane sheet/ polycarbonate sheet;
glass sheet/interlayer sheet/glass sheet/polymer sheet/ acrylic rigid sheet;
rigid sheet/interlayer sheet/rigid sheet/interlayer sheet/ polymer film (e.g., hardcoated bi-axially oriented pet film);
glass sheet/interlayer sheet/glass sheet/interlayer sheet/ polymer film;
rigid sheet/interlayer sheet/rigid sheet/polymer sheet/polymer film;
glass sheet/interlayer sheet/glass sheet/polymer sheet/ polymer film;
rigid sheet/interlayer sheet/rigid sheet/pvb sheet/polymer film;
glass sheet/interlayer sheet/glass sheet/pvb sheet/bi-axially oriented pet film;
rigid sheet/interlayer sheet/rigid sheet/interlayer sheet/ rigid sheet/interlayer sheet/rigid sheet;
glass sheet/interlayer sheet/glass sheet/interlayer sheet/ glass sheet/interlayer sheet/glass sheet;
glass sheet/interlayer sheet/glass sheet/interlayer sheet sheet/glass sheet/interlayer sheet/rigid sheet;
rigid sheet/interlayer sheet/rigid sheet/interlayer sheet/ rigid sheet/polymer sheet/rigid sheet;
glass sheet/interlayer sheet/glass sheet/interlayer sheet/ glass sheet/polyurethane sheet/polycarbonate sheet;
glass sheet/interlayer sheet/glass sheet/interlayer sheet/ glass sheet/polymer sheet/acrylic rigid sheet;
rigid sheet/interlayer sheet/rigid sheet/interlayer sheet/ rigid sheet/interlayer sheet/polymer film;
glass sheet/interlayer sheet/glass sheet/interlayer sheet/ glass sheet/interlayer sheet/polymer film;
rigid sheet/interlayer sheet/rigid sheet/interlayer sheet/ rigid sheet/polymer sheet/polymer film;
glass sheet/interlayer sheet/glass sheet/interlayer sheet/ glass sheet/polymer sheet/polymer film;
glass sheet/interlayer sheet/glass sheet/interlayer sheet/ glass sheet/polymer sheet/bi-axially oriented pet film;
glass sheet/interlayer sheet/glass sheet/interlayer sheet/ glass sheet/pvb sheet/bi-axially oriented pet film;
rigid sheet/interlayer sheet/rigid sheet/interlayer sheet/ rigid sheet/interlayer sheet/rigid sheet/interlayer sheet/ rigid sheet;
glass sheet/interlayer sheet/glass sheet/interlayer sheet/ glass sheet/interlayer sheet/glass sheet/interlayer sheet/ glass sheet;
glass sheet/interlayer sheet/glass sheet/interlayer sheet sheet/glass sheet/interlayer sheet/glass sheet/interlayer sheet/rigid sheet;
rigid sheet/interlayer sheet/rigid sheet/interlayer sheet/ rigid sheet/interlayer sheet/rigid sheet/polymer sheet/ rigid sheet;
glass sheet/interlayer sheet/glass sheet/interlayer sheet/ glass sheet/interlayer sheet/glass sheet/polyurethane sheet/polycarbonate sheet;
glass sheet/interlayer sheet/glass sheet/interlayer sheet/ glass sheet/interlayer sheet/glass sheet/polymer sheet/ acrylic rigid sheet;
rigid sheet/interlayer sheet/rigid sheet/interlayer sheet/ rigid sheet/interlayer sheet/rigid sheet/interlayer sheet/ polymer film;
glass sheet/interlayer sheet/glass sheet/interlayer sheet/ glass sheet/interlayer sheet/glass sheet/interlayer sheet/ polymer film;
rigid sheet/interlayer sheet/rigid sheet/interlayer sheet/ rigid sheet/interlayer sheet/rigid sheet/polymer sheet/ polymer film;
glass sheet/interlayer sheet/glass sheet/interlayer sheet/ glass sheet/interlayer sheet/glass sheet/polymer sheet/ polymer film;
glass sheet/interlayer sheet/glass sheet/interlayer sheet/ glass sheet/interlayer sheet/glass sheet/polymer sheet/ bi-axially oriented pet film;
glass sheet/interlayer sheet/glass sheet/interlayer sheet/ glass sheet/interlayer sheet/glass sheet/pvb sheet/bi-axially oriented pet film;
rigid sheet/interlayer sheet/rigid sheet/interlayer sheet/ rigid sheet/interlayer sheet/rigid sheet/interlayer sheet/ rigid sheet/interlayer sheet/rigid sheet;
glass sheet/interlayer sheet/glass sheet/interlayer sheet/ glass sheet/interlayer sheet/glass sheet/interlayer sheet/ glass sheet/interlayer sheet/glass sheet;
rigid sheet/interlayer sheet/rigid sheet/interlayer sheet/ rigid sheet/interlayer sheet/rigid sheet/interlayer sheet/ rigid sheet/polymer sheet/polymer film; and glass sheet/interlayer sheet/glass sheet/interlayer sheet/
  glass sheet/interlayer sheet/glass sheet/interlayer sheet/
  glass sheet/polymer sheet/polymer film;

wherein the same notes apply as above with respect to other preferred safety laminates; specifically, repeated layers may be the same or different, and "/" indicates layers that may be adjacent, adjoining or contiguous.

If desired, one or both surfaces of any of the component layers comprised in the safety laminate may be treated prior to the lamination process to enhance the adhesion to other laminate layers. This adhesion enhancing treatment may take any form known within the art and includes flame treatments (see, e.g., U.S. Pat. Nos. 2,632,921; 2,648,097; 2,683,894; and 2,704,382), plasma treatments (see e.g., U.S. Pat. No. 4,732,814), electron beam treatments, oxidation treatments, corona discharge treatments, chemical treatments, chromic acid treatments, hot air treatments, ozone treatments, ultraviolet light treatments, sand blast treatments, solvent treatments, and combinations of two or more thereof. Also, the adhesion strength may be further improved by further applying an adhesive or primer coating on the surface of the laminate layer(s). For example, U.S. Pat. No. 4,865,711 discloses a film or sheet with improved bondability, which has a thin layer of carbon deposited on one or both surfaces. Other exemplary adhesives or primers may include silanes, poly (allyl amine) based primers (see e.g., U.S. Pat. Nos. 5,411,845; 5,770,312; 5,690,994; and 5,698,329), and acrylic based primers (see e.g., U.S. Pat. No. 5,415,942). The adhesive or primer coating may take the form of a monolayer of the adhesive or primer and have a thickness of about 0.0004 to about 1 mil (about 0.00001 to about 0.03 mm), or preferably, about 0.004 to about 0.5 mil (about 0.0001 to about 0.013 mm), or more preferably, about 0.004 to about 0.1 mil (about 0.0001 to about 0.003 mm).

Any lamination process known within the art (such as an autoclave or a non-autoclave process) may be used to prepare the safety laminates. For example, the laminate may be made by an autoclave process, such as disclosed in U.S. Pat. No. 3,311,517, or a non-autoclave lamination process, such as disclosed in U.S. Pat. Nos. 3,234,062; 3,852,136; 4,341,576; 4,385,951; 4,398,979; 5,536,347; 5,853,516; 6,342,116; and 5,415,909, U.S. Patent Publication No. 2004/0182493, European Patent No. EP 1 235 683 B1, PCT Patent Publication Nos. WO91/01880 and WO03057478.

The following examples are provided to describe the invention in further detail. These examples, which set forth a preferred mode presently contemplated for carrying out the invention, are intended to illustrate and not to limit the invention.

EXAMPLES

Examples E1 to E3 and Comparative Examples CE1 to CE16

The ionomers used in each of the following examples were prepared as follows. First, the precursor acid copolymers (i.e., the unneutralized copolymers of ethylene and methacrylic acid) were produced by a free radical polymerization in an adiabatic continuous stirred autoclave, substantially according to the procedure described in Example 1 of U.S. Pat. No. 5,028,674, with the following exceptions: (1) by controlling the ratio of ethylene to methacrylic acid and the flow rate of the initiator, the reactor conditions were maintained at a temperature of about 200° C. to about 260° C. and at a pressure of between 170 and 240 MPa; (2) no propane telogen was fed in the reactor (except in CE13); (3) the total concentration of methanol in the reactor was maintained at about 2 to 5 mol %, based on the total feed of ethylene, methacrylic acid, methanol and initiator solution (or based on the total feed of propane telogen, ethylene, methacrylic acid, methanol, and initiator solution in CE13); and (4) the system was maintained at a steady state with the residence time of the material flowing through the reactor being about 5 seconds to 2 minutes. In addition, depending on the particular acid copolymer to be synthesized, one of two different free-radical initiators were used, tert-butyl peracetate or tert-butyl peroctoate. When tert-butyl peracetate was the initiator (as in Examples E1, E2, E3, and Comparative Examples CE1, CE2, CE3, CE13, and CE15), it was utilized as a solution in odorless mineral spirits at 50% concentration. When tert-butyl peroctoate was the initiator (as in Comparative Examples CE4, CE5, CE6, CE7, CE8, CE9, CE10, CE11, CE12, CE14, and CE16), it was utilized as a mixture at 90% concentration in odorless mineral spirits. Then the ionomers were obtained by partially neutralizing the precursor copolymers of ethylene and methacrylic acid with sodium hydroxide solution either in a single screw extruder under high shear melt mixing conditions with the melt temperature set at 200° C. to 270° C., or using the general method described in Example 1 of U.S. Pat. No. 6,518,365.

The as-obtained ionomers then underwent differential scanning calorimetry (DSC) testing in accordance with ASTM D3418 with a temperature profile of (a) heating to 180° C.; (b) holding for 3 minutes; (c) cooling to 25° C. at a rate of 10° C./min; (d) holding for 3 minutes; and (e) heating to 180° C. at a rate of 10° C./min. The freeze enthalpies of the ionomers were determined and are reported in Table 1. The results demonstrate that the freeze enthalpies of each of the sodium ionomers described herein (Examples E1 to E3) were not detectable, while each of the prior art ionomers (Comparative Examples CE1 to CE16) has a freeze enthalpy greater than 3 j/g.

TABLE 1

| Example | Single Phase[1] | MAA (wt %)[2] | MFR (Base Resin)[3] | % Neut. (Sodium)[4] | MFR (Ionomer)[5] | Freeze Enthalpy (j/g) | Laminate Haze Cooling Rate A | Cooling Rate B |
|---|---|---|---|---|---|---|---|---|
| E1 | Yes | 23 | 270 | 43 | 3.2 | n.d.[6] | 0.7 | 1.1 |
| E2 | Yes | 23 | 270 | 52 | 0.8 | n.d.[6] | 1.2 | 1.4 |
| E3 | Yes | 22 | 350 | 53 | 2.5 | n.d.[6] | 0.6 | 0.6 |
| CE1 | Yes | 23 | 270 | 33 | 8.2 | 3.13 | 0.9 | 9.8 |
| CE2 | Yes | 23 | 270 | 26 | 16.0 | 7.32 | 5.3 | 21.6 |
| CE3 | Yes | 23 | 270 | 14 | 40.0 | 21.97 | 5.1 | 59.1 |
| CE4 | No | 22 | 25 | 38 | 0.4 | 4.38 | 1.2 | 8.6 |
| CE5 | No | 22 | 25 | 30 | 0.9 | 13.36 | 3.4 | 11.9 |
| CE6 | No | 22 | 25 | 25 | 1.5 | 16.31 | 3.8 | 17.2 |
| CE7 | No | 22 | 25 | 20 | 2.3 | 20.95 | 3.2 | 23.5 |

TABLE 1-continued

| Example | Single Phase[1] | MAA (wt %)[2] | MFR (Base Resin)[3] | % Neut. (Sodium)[4] | MFR (Ionomer)[5] | Freeze Enthalpy (j/g) | Laminate Haze Cooling Rate A | Laminate Haze Cooling Rate B |
|---------|-----------------|---------------|---------------------|---------------------|------------------|----------------------|------------------------------|------------------------------|
| CE8  | No | 22 | 25  | 15 | 3.4 | 27.15 | 2.5 | 33.5 |
| CE9  | No | 22 | 30  | 32 | 1.2 | 10.18 | 1.9 | 10.8 |
| CE10 | No | 22 | 30  | 32 | 1.2 | 16.09 | 2.6 | 14.4 |
| CE11 | No | 22 | 25  | 26 | 1.8 | 14.22 | 1.8 | 18.7 |
| CE12 | No | 21 | 30  | 29 | 2.0 | 21.67 | 1.5 | 21.2 |
| CE13 | No | 20 | 350 | 49 | 3.2 | 4.4   | 1.1 | 12.5 |
| CE14 | No | 20 | 12  | 23 | 0.5 | 25.47 | 2.6 | 26.7 |
| CE15 | No | 19 | 225 | 45 | 4.5 | 10.81 | 3.1 | 27.5 |
| CE16 | No | 19 | 60  | 37 | 2.6 | 18.20 | 1.5 | 50.8 |

Notes for Table 1:
[1] During the polymerization process, a single phase was maintained substantially throughout the reactor;
[2] Weight percent of copolymerized units of methacrylic acid comprised in the precursor acid copolymer, from which the ionomer that forms the laminate interlayer sheet is derived;
[3] The melt flow rate (MFR) of the precursor acid copolymer was calculated based on the MFR of the ionomer;
[4] "% neut. Sodium" is the percentage of carboxylic acid groups present in the precursor acid copolymer which have been neutralized;
[5] The melt flow rate (MFR) of the ionomer, as determined in accordance with ASTM D1238 at 190° C. and 2.16 kg;
[6] "n.d." means that the freeze enthalpy is not detectable, when measured in accordance with ASTM D3418-03.

Further, the ionomers were fed into 25 mm diameter Killion extruders under the temperature profile set in Table 2 and extrusion cast into polymer sheets. Specifically, the polymer throughput was controlled by adjusting the screw speed to maximum throughput, a 150 mm slot die with a nominal gap of 2 mm was fed by the extruder, the cast sheet was fed onto a 200 mm diameter polished chrome chill roll held at a temperature of between 10° C. and 15° C. and rotating at 1 to 2 rpm. The nominally 0.76 mm (30 mil) thick sheets were then removed and cut into 300×300 mm squares.

TABLE 2

| Extruder Zone | Temperature (° C.) |
|---------------|--------------------|
| Feed    | Ambient |
| Zone 1  | 100-170 |
| Zone 2  | 150-210 |
| Zone 3  | 170-230 |
| Adapter | 170-230 |
| Die     | 170-230 |

The ionomer sheets were used as interlayer sheets to form glass laminates. Specifically, annealed glass sheets (100×100×3 mm) were washed with a solution of trisodium phosphate (5 g/l) in de-ionized water at 50° C. for 5 min, then rinsed thoroughly with de-ionized water and dried. Six sheets of each ionomer (about 0.76 mm thick) were stacked together and placed between the two lites of glass sheet to form a pre-lamination assembly having an interlayer with a total thickness of about 180 mils (4.57 mm). The moisture level of the ionomer sheets was kept below 0.06 wt % by minimizing their exposure to ambient conditions (approximately 35% RH). The pre-lamination assembly was then stabilized by the application of polyester tape in several locations to maintain relative positioning of each layer with the glass lites. A nylon fabric strip was placed around the periphery of the assembly to facilitate air removal from within the layers.

The pre-lamination assembly was placed inside a nylon vacuum bag and sealed. A connection was made to a vacuum pump and the air within the bagged assembly was substantially removed by reducing the air pressure inside the bag to below 50 millibar absolute. The bagged assembly was then heated in a convection air oven to 120° C. and maintained at these conditions for 30 min. A cooling fan was used to cool the assembly to near ambient temperature, after which the vacuum source was disconnected and the bag was removed, yielding a fully pre-pressed assembly of glass and interlayer. Although hermetically sealed around the periphery, several areas of the assembly were not fully bonded as indicated by the presence of bubbles in these areas.

The pre-pressed assembly was placed in an air autoclave and the temperature and pressure were increased from ambient to 135° C. and 13.8 bar over 15 min. The assembly was maintained at these conditions for 30 min, after which, the resulting laminate was rapidly cooled (i.e., at Cooling Condition A of 2.5° C./min) to room temperature at ambient pressure. The as-obtained laminate was tested for haze in accordance with ASTM D1003 using a Haze-gard Plus hazemeter (BYK-Gardner, Columbia, Md.). After this measurement, the same laminate was heated to 120° C. in an oven and maintained at such temperature for 2 to 3 hours before it was slowly cooled (i.e., Cooling Condition B of 0.1° C./min) to room temperature and then tested for haze.

As shown by the Comparative Examples (CE1 to CE16), the haze levels of glass laminates comprising prior art ionomer interlayer sheets are dependent on the cooling rate under which the laminates were obtained. In general, slower cooling rate would increase the laminate haze and therefore decrease the optical property thereof. As illustrated by the data in Table 1, however, glass laminates comprising interlayer sheets made from ionomers prepared by neutralizing the precursor acid copolymers described herein (Examples E1 to E3) tend to have lower haze than those comprising prior art ionomer interlayer sheets (Comparative Examples CE1 to CE16). Additionally, the haze levels of the glass laminates in Examples E1 to E3 were not affected by the cooling rate under which the laminates were obtained.

Example E4 and Comparative Example 17

In each of Example E4 and Comparative Example 17, a bullet-resistant laminate with the component laminate layers listed in Table 3 were prepared as follows. First, all the component layers of each laminate with the dimensions of 500×500 mm were stacked to form a pre-lamination assembly. The pre-lamination assembly also included a cover glass sheet placed over the PET film layer in Example E4 or the polycarbonate sheet layer in Comparative Example CE17. The pre-lamination assembly was then placed within a vacuum bag, which is sealed and a vacuum is applied to remove the air from the vacuum bag and to remove any air contained between the assembly. The assembly was then subjected to autoclaving at 135° C. for 60 min in an air autoclave to a pressure of 200 psig (14.3 bar). The air was cooled while no more air was added to the autoclave. After 20 min of cooling (or when the air temperature reaches less than about 50° C.), the excess pressure was vented and the vacuum bag containing the laminated assembly was removed from the autoclave. The vacuum was then released from the vacuum bag, the resulting laminate was removed from the vacuum bag, and the cover glass sheet was removed from the final laminate.

The laminates were then subjected to ballistic testing according to European Standard EN 1063, Level BR4, whose conditions are listed below:
  Type of Weapon: hand gun;
  Calibre: 0.44 Remington Magnum;
  Type of Bullet: full copper alloy jacket, flat nose, soft core (lead);
  Mass of Bullet: 15.6±0.1 g;
  Test Range: 5.00±0.5 m;
  Bullet Velocity: 440±10 m/s;
  Number of Strikes: 3; and
  Striking Distance: 120±10 mm.
The results of the ballistic tests are set forth in Table 3.

More specifically, ION A was a copolymer of ethylene and methacrylic acid containing 21.7 wt % of copolymerized units of methacrylic acid that was 26% neutralized with a sodium ion-containing base and had a MFR of 1.8 g/10 min (as determined in accordance with ASTM D1238 at 190° C. and 2.16 kg). The MFR of the precursor ethylene methacrylic acid copolymer of ION A, prior to neutralization, was 23 g/10 min (190° C. and 2.16 kg). ION B was a copolymer of ethylene and methacrylic acid containing 21.7 wt % of copolymerized units of methacrylic acid that was 53% neutralized with a sodium ion-containing base and had a MFR of 2.5 g/10 min (190° C. and 2.16 kg). The MFR of the precursor ethylene methacrylic acid copolymer of ION B, prior to neutralization, was 350 g/10 min (190° C. and 2.16 kg).

In forming the glass laminates, annealed glass sheets (100× 100×3 mm) were washed with a solution of trisodium phosphate (5 g/l) in de-ionized water at 50° C. for 5 min, then rinsed thoroughly with de-ionized water and dried. Three layers of each respective ionomer sheets (about 0.76 mm thick each) were stacked together and placed between the two glass sheets (to yield an interlayer thickness of 180 mils (2.28 mm)). The moisture level of the ionomer sheets was kept below 0.06% by weight by minimizing exposure to ambient conditions (~35% RH). The pre-lamination assembly was

TABLE 3

| Example | Layer 1 | Layer 2 | Layer 3 | Layer 4 | Layer 5 | Layer 6 | Layer 7 | Total Thickness | Areal Density (kg/m$^2$) | Bullet Energy (j) | Test Results |
|---|---|---|---|---|---|---|---|---|---|---|---|
| CE17 | Glass[1] (8 mm) | PVB[2] (0.76 mm) | Glass[1] (8 mm) | Polyurethane (1.9 mm) | Polycarbonate (2.5 mm) | | | 20 mm | 43.3 | 1510 | Fail |
| E4 | Glass[1] (6 mm) | Ionomer[3] (1.5 mm) | Glass[1] (6 mm) | Ionomer[3] (6 mm) | Glass[1] (2.5 mm) | PVB[2] (1.52 mm) | PET[4] (0.18 mm) | 23.2 mm | 43.5 | 1510 | Pass |

Notes for Table 3:
[1] Annealed glass;
[2] A poly(vinyl butyral) sheet from DuPont;
[3] Ionomer resin used in E3;
[4] 0.18 mm thick Melinex ® film from DuPont Teijin Films, which was on one side primed with a poly(allyl amine) based primer as disclosed in U.S. Pat. No. 7,189,457 and on the other side coated with an abrasion resistant hardcoat as disclosed in European Patent No. 157030.

Example E5 and Comparative Example CE18

Figure 2:
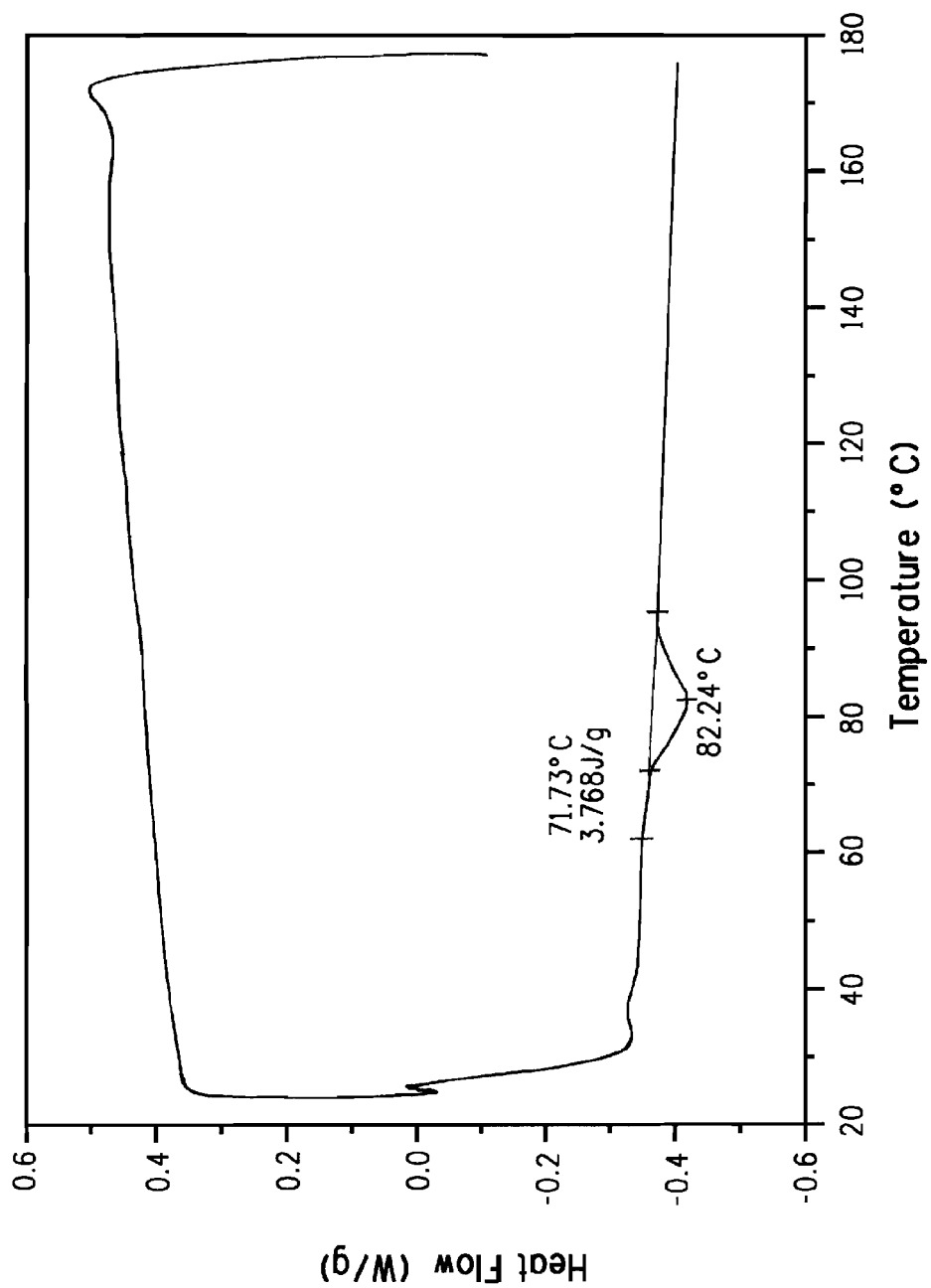
FIG. 2 is a DSC trace of an ionomer described herein.

The freeze enthalpies of an ionomer suitable for use herein and a prior art ionomer were determined by DSC, according to the methods described above. FIG. 1 shows the results of Comparative Example CE18. Specifically, FIG. 1 is the DSC trace of a prior art ionomer, clearly showing peaks corresponding to heat flow in and out of the ionomer sample. Integration of these peaks provides the enthalpy of the phase transitions in the material. FIG. 2 shows the results of Example E5; specifically, it is the DSC trace of a sodium ionomer produced from a first precursor acid copolymer described herein. In contrast to FIG. 1, FIG. 2 shows that the sodium ionomer produced from a first precursor acid copolymer described herein has an insignificantly small or undetectable freezing enthalpy.

Examples E6, E7 and E8 and Comparative Examples CE19 and CE20

In the following examples, two ionomer resins (ION A and ION B) were prepared by a process similar to that described above. The ionomers or blends thereof were then fed into 25 mm diameter Killion extruders under the temperature profile set forth in Table 1 and extrusion cast into polymer sheets. The as-obtained polymer sheets were in turn used in forming glass laminates.

stabilized by application of polyester tape in several locations to maintain the relative positioning of each layer with the glass sheets. A nylon fabric strip was placed around the periphery of the assembly to facilitate air removal from within the layers.

The assembly was placed inside a nylon vacuum bag, sealed and then a connection was made to a vacuum pump. The air was substantially removed from within the bagged assembly by reducing the air pressure inside the bag to below 50 millibar absolute. The bagged assembly was then heated in a convection air oven to 120° C. and maintained at these conditions for 30 min. A cooling fan was used to cool the assembly to near ambient temperature, after which the vacuum source was disconnected and the bag was removed, yielding a fully pre-pressed assembly of glass and interlayer. Although hermetically sealed around the periphery, several areas of the assembly were not fully bonded as indicated by the presence of bubbles in these areas. The assembly was then placed in an air autoclave and the temperature and pressure were increased from ambient to 135° C. at 13.8 bar over 15 min. The assembly was maintained at these conditions for 30 min, after which the resulting laminate was rapidly cooled (i.e., at Cooling Rate A of 2.5° C./min) to room temperature at ambient pressure. The thus-obtained laminate was tested for haze in accordance with ASTM D1003 using a Haze-gard Plus hazemeter (BYK-Gardner, Columbia, Md.). Thereafter, the same laminate was heated to 120° C. in an oven and held at that temperature for 2 to 3 hours before it was slowly cooled (i.e., Cooling Rate B of 0.1° C./min) to room temperature and then tested for haze again. The haze results are reported in Table 4 below.

TABLE 4

| Sample No. | Ionomer Component | | Neutralization Level (%) | MFR (g/10 min) | Haze (%) | |
|---|---|---|---|---|---|---|
| | ION A (wt %) | ION B (wt %) | | | Cooling Rate A | Cooling Rate B |
| CE19 | 100 | 0 | 26 | 1.8 | 1.05 | 6.64 |
| E6 | 80 | 20 | 31 | 2.2* | 0.83 | 5.9 |
| E7 | 45 | 55 | 41 | 2.3* | 0.67 | 0.88 |
| E8 | 25 | 75 | 46 | 2.4* | 0.62 | 0.49 |
| CE20 | 0 | 100 | 53 | 2.5 | 0.58 | 0.57 |

*the MFR level for E6-E8 blends were calculated by the ratio of ION A and ION B.

Examples E9 to E12 and Comparative Example CE21

Similarly to Example E4 and Comparative Example CE17, in each of Examples E9 to E12 and Comparative Example CE21, a ballistic resistant laminate having the dimensions of 500×500 mm was prepared with the component laminate layers listed in Table 5. The laminates were subjected to testing under European Standard EN 1063, Level BR4, and the test results are listed in Table 5.

While certain of the preferred embodiments of this invention have been described and specifically exemplified above, it is not intended that the invention be limited to such embodiments. Various modifications may be made without departing from the scope and spirit of the invention, as set forth in the following claims.

TABLE 5

| Sample | Layer 1 | Layer 2 | Layer 3 | Layer 4 | Layer 5 | Layer 6 | Layer 7 | Total Thickness (mm) | Areal Density (kg/m²) | Ballistic Test Result |
|---|---|---|---|---|---|---|---|---|---|---|
| CE21 | Glass¹ (8 mm) | PVB² (0.76 mm) | Glass¹ (8 mm) | Polyurethane (1.9 mm) | Polycarbonate (2.5 mm) | | | 20 | 43.3 | Fail |
| E9 | Glass¹ (6 mm) | Ionomer³ (1.5 mm) | Glass¹ (6 mm) | Ionomer³ (6 mm) | Glass¹ (2.5 mm) | PVB² (1.52 mm) | PET⁴ (0.18 mm) | 23.3 | 43.5 | Pass |
| E10 | Glass¹ (6 mm) | Ionomer³ (1.5 mm) | Glass¹ (6 mm) | Ionomer³ (4.5 mm) | Glass¹ (2.5 mm) | PVB² (1.52 mm) | PET⁴ (0.18 mm) | 21.6 | 42 | Fail |
| E11 | Glass¹ (6 mm) | Ionomer³ (1 mm) | Glass¹ (6 mm) | Ionomer³ (5 mm) | Glass¹ (2.5 mm) | PVB² (1.52 mm) | PET⁴ (0.18 mm) | 20.9 | 41.1 | Pass |
| E12 | Glass¹ (6 mm) | Ionomer³ (1 mm) | Glass¹ (6 mm) | Ionomer³ (6 mm) | Glass¹ (2.5 mm) | PVB² (1.52 mm) | PET⁴ (0.18 mm) | 21.8 | 42.1 | Pass |

Notes for Table 5:
¹Annealed glass;
²A Butacite ® poly(vinyl butyral) sheet from DuPont;
³Ionomer resin used in E8;
⁴Melinex ® film (0.18 mm thick) from DuPont Teijin Films, which was primed on one side with a poly(allyl amine) based primer as disclosed in U.S. Pat. No. 7,189,457 and on the other side coated with an abrasion resistant hardcoat as disclosed in European Patent No. 157030.

What is claimed is:

1. A safety laminate comprising at least one interlayer sheet that is laminated to one or more rigid sheets, one or more other polymeric interlayer sheets, or one or more film layers; said at least one interlayer sheet comprising an ionomer composition; and said ionomer composition comprising a first ionomer that is the neutralized product of a first precursor acid copolymer;
wherein (i) the first precursor acid copolymer comprises copolymerized units of ethylene and about 20 to about 30 wt %, based on the total weight of the first precursor acid copolymer, of copolymerized units of a first α,β-ethylenically unsaturated carboxylic acid selected from the group consisting of acrylic acid and methacrylic acid; (ii) the first precursor acid copolymer has a melt flow rate of about 10 to about 4000 g/10 min, as determined in accordance with ASTM D1238 at 190° C. and 2.16 kg; and wherein (iii) said precursor acid copolymer, being neutralized to a level of about 40% to about 90% based on the total number of the carboxylic acid groups present in the precursor acid copolymer, produces a sodium ionomer, said sodium ionomer comprising carboxylate groups and counterions, said counterions consisting essentially of sodium cations, and wherein the sodium ionomer has a melt flow rate of about 0.7 to about 25 g/10 min and a freeze enthalpy that is not detectable or that is less than about 3.0 j/g, when determined by differential scanning calorimetry in accordance with ASTM D3418.

2. The safety laminate of claim 1, wherein the first precursor acid copolymer has a melt flow rate of about 100 to about 500 g/10 min.

3. The safety laminate of claim 1, wherein the first precursor acid copolymer comprises about 20 to about 25 wt % of copolymerized units of the first α,β-ethylenically unsaturated carboxylic acid.

4. The safety laminate of claim 1, wherein about 40% to about 70% of the carboxylic acid groups present in the first precursor acid copolymer have been neutralized by a sodium ion-containing base.

5. The safety laminate of claim 4, wherein the first ionomer has a melt flow rate of about 1 to about 10 g/10 min.

6. The safety laminate of claim 4, wherein the first ionomer has a freeze enthalpy less than or equal to 2 j/g.

7. The safety laminate of claim 1, wherein the ionomer composition further comprises a second ionomer that is the neutralization product of a second precursor acid copolymer, wherein (i) the second precursor acid copolymer comprises copolymerized units of ethylene and about 18 to about 30 wt % of copolymerized units of a second α,β-ethylenically unsaturated carboxylic acid selected from the group consisting of acrylic acid and methacrylic acids; (ii) the second α,β-ethylenically unsaturated carboxylic acid is the same as or different from the first α,β-ethylenically unsaturated carboxylic acid; (iii) the second precursor acid copolymer has a melt flow rate of about 60 g/10 min or less; and (iv) the second ionomer has a melt flow rate of about 10 g/10 min or less, as determined in accordance with ASTM D1238 at 190° C. and 2.16 kg.

8. The safety laminate of claim 7, wherein the first precursor acid copolymer has a melt flow rate of about 150 to about 400 g/10 min and the second precursor acid copolymer has a melt flow rate of about 30 g/10 min or less.

9. The safety laminate of claim 7, wherein the first precursor acid copolymer comprises about 20 to about 25 wt % of copolymerized units of the first α,β-ethylenically unsaturated carboxylic acid; wherein the second precursor acid copolymer comprises about 20 to about 25 wt % of copolymerized units of the second α,β-ethylenically unsaturated carboxylic acid; wherein the first and second α,β- ethylenically unsaturated carboxylic acid are the same or different; and werein the amounts of the copolymerized units of the first and the second α,β-ethylenically unsaturated carboxylic acids are the same or different.

10. The safety laminate of claim 7, wherein the first and the second ionomers comprise cations that consist essentially of sodium cations.

11. The safety laminate of claim 7, wherein the first ionomer has a melt flow rate of about 0.7 to about 10 g/10 min and the second ionomer has a melt flow rate of about 5 g/10 min or less.

12. The safety laminate of claim 7, wherein the ionomer composition comprises about 60 to about 95 wt % of the first ionomer and about 5 to about 40 wt % of the second ionomer, based on the total weight of the ionomer composition.

13. The safety laminate of claim 1, wherein the rigid sheet comprises a material having a modulus of about 690 MPa or greater, as determined in accordance with ASTM D638, and wherein the material is selected from the group consisting of glass, metal, ceramic, and polymers.

14. The safety laminate of claim 1 that comprises the one or more film layers, wherein the film layer(s) are a metal film or a polymeric film comprising one or more materials selected from the group consisting of polyesters, polycarbonates, polyolefins, norbornene polymers, polystyrenes, styrene-acrylate copolymers, acrylonitrile-styrene copolymers, polysulfones, polyamides, polyurethanes, acrylic polymers, cellulose acetates, cellophanes, vinyl chloride polymers and fluoropolymers.

15. The safety laminate of claim 1, comprising the one or more other polymeric interlayer sheets, wherein the one or more other polymeric interlayer sheets comprise one or more materials selected from the group consisting of poly(vinyl acetals), poly(vinyl chlorides), polyurethanes, ethylene/vinyl acetate copolymers, acid copolymers, and ionomers.

16. The safety laminate of claim 1, comprising two rigid sheets; wherein the rigid sheets are glass sheets; and wherein the at least one interlayer sheet comprising the ionomer composition is laminated between the two glass sheets.

17. The safety laminate of claim 1, comprising one rigid sheet and one film layer; wherein the rigid sheet is a glass sheet; wherein the film layer is a polyester film that is coated with an abrasion resistant hardcoat; wherein the at least one interlayer sheet comprising the ionomer composition is laminated between the glass sheet and the polyester film; and wherein the abrasion resistant hardcoat is coated on the surface of the polyester film that is facing away from the interlayer sheet.

18. The safety laminate of claim 1, which comprises n rigid sheet or film layers and (n−1) polymeric interlayer sheets, wherein (a) each of the adjacent pairs of the rigid sheet or film layers is interspaced by one of the polymeric interlayer sheets; (b) at least one of the (n−1) polymeric interlayer sheets comprises the ionomer composition, and (c) n is an integer and 2<n<10.

19. The safety laminate of claim 18, which comprises an impact zone that faces to the impact force and an anti-spall zone that is firmly adhered to the impact zone and faces away from the impact force, wherein (A) the impact zone is formed by the n rigid sheets and the (n−1) polymeric interlayer sheets; and (B) the anti-spall zone is formed of an additional polymer sheet and an additional film layer with a first surface of the additional polymer sheet adhered firmly to the impact zone and a second surface of the polymer sheet adhered firmly to the additional polymer film.

20. The safety laminate of claim 19, wherein (A) each of the n rigid sheets are glass sheets; (B) each of the (n−1) polymeric interlayer sheets comprises the ionomer composition; (C) the additional polymeric interlayer sheet comprises a poly(vinyl butyral); and (D) the additional polymer film is a poly(ethylene terephthalate) film having a surface that is opposite from the impact zone and a hardcoat adhered to the surface.

* * * * *